United States Patent

White, Jr. et al.

[11] Patent Number: 5,613,704
[45] Date of Patent: Mar. 25, 1997

[54] DIFFUSER STRUCTURE FOR CLAMPING AN INFLATOR IN AN AIR BAG MODULE

[75] Inventors: Michael J. White, Jr., Shelby Township; John P. Wallner, Rochester, both of Mich.

[73] Assignee: TRW Vehicle Safety Systems Inc., Lyndhurst, Ohio

[21] Appl. No.: 635,707

[22] Filed: Apr. 22, 1996

[51] Int. Cl.$^6$ ............................................. B60R 21/28
[52] U.S. Cl. ................................... 280/740; 280/732
[58] Field of Search ............................. 280/740, 732, 280/728.1, 743.1, 728.2

[56] References Cited

U.S. PATENT DOCUMENTS

| | | | |
|---|---|---|---|
| 4,153,273 | 5/1979 | Risko | 280/740 |
| 5,062,664 | 11/1991 | Bishop et al. | 280/743 |
| 5,149,130 | 9/1992 | Wooley et al. | 280/743 |
| 5,186,492 | 2/1993 | Wright et al. | 280/743 |
| 5,308,108 | 5/1994 | Rion | 280/728.1 |
| 5,340,147 | 8/1994 | Fontecchio et al. | 280/228.1 |
| 5,405,164 | 4/1995 | Paxton et al. | 280/728.2 |
| 5,433,471 | 7/1995 | Shepherd et al. | 280/732 X |
| 5,468,012 | 11/1995 | Mihm | 280/728.2 |
| 5,470,105 | 11/1955 | Rose et al. | 280/740 |
| 5,536,041 | 7/1996 | Acker et al. | 280/740 |

Primary Examiner—Christopher P. Ellis
Attorney, Agent, or Firm—Tarolli, Sundheim, Covell, Tummino & Szabo

[57] ABSTRACT

A diffuser (18) defines a plenum (50) containing an inflator (16). The diffuser (18) has diffuser walls (94,96) with inflation fluid outlet openings (100) extending outward from the plenum (50), and further has first and second clamping walls (110,112) facing in opposite directions across the plenum (50). The first clamping wall (110) is bendable pivotally inward across the plenum (50). A load bearing structure that includes two locking tabs (120,122) and a fastener (126) maintains the first clamping wall (110) under a bending load. The bending load urges the first clamping wall (110) pivotally inward across the plenum (50) so as to clamp and retain the inflator (16) tightly between the clamping walls (110,112).

17 Claims, 4 Drawing Sheets

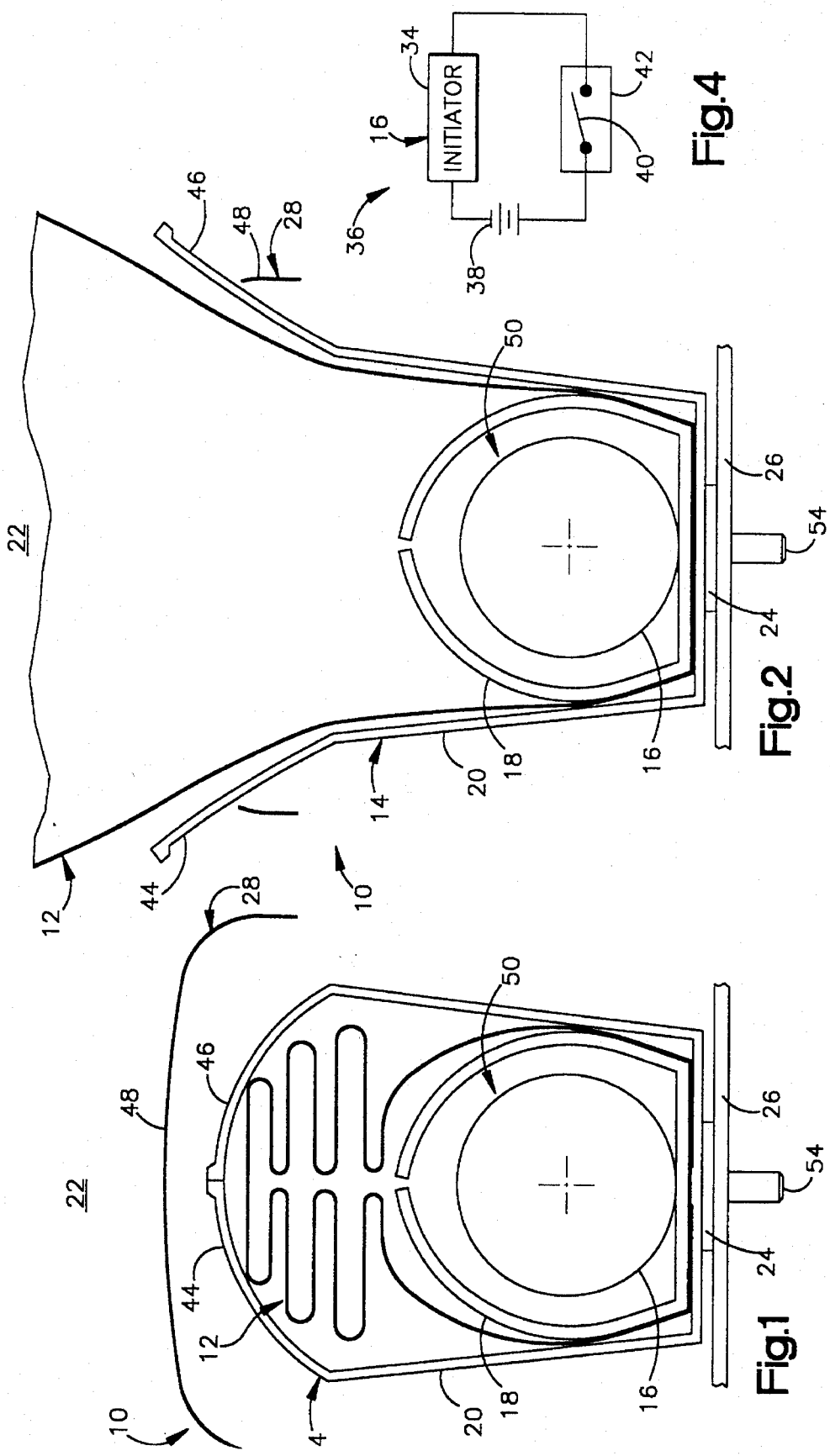

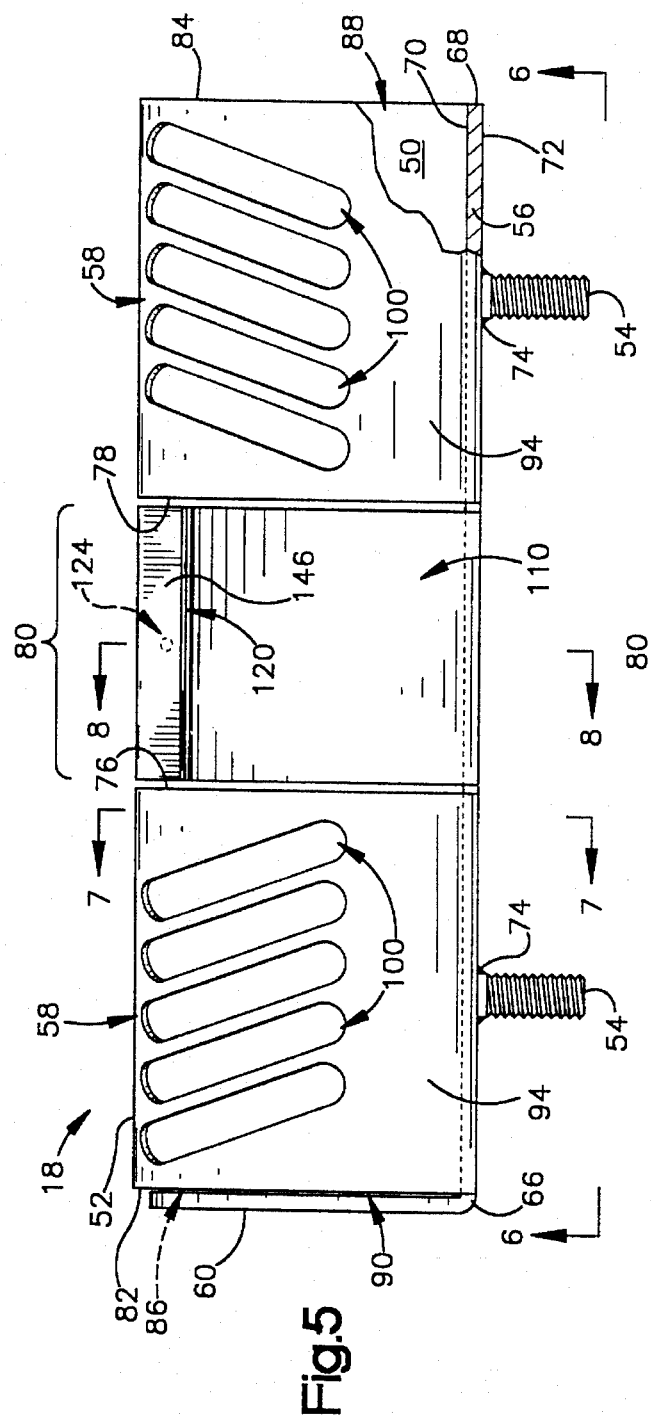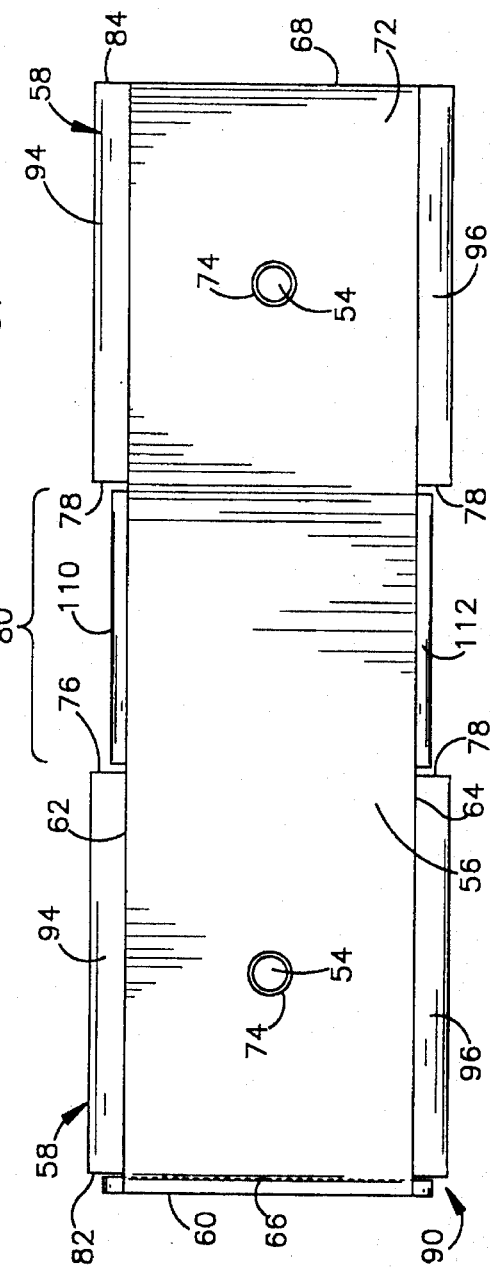

DIFFUSER STRUCTURE FOR CLAMPING AN INFLATOR IN AN AIR BAG MODULE

FIELD OF THE INVENTION

The present invention relates to inflator for an inflatable vehicle occupant protection device, such as an air bag, and particularly relates to a diffuser for the inflator.

BACKGROUND OF THE INVENTION

An inflatable vehicle occupant protection device, such as an air bag, is part of an apparatus which further includes a collision sensor and an inflator. When the collision sensor senses a vehicle collision having at least a predetermined threshold level of severity, the inflator is actuated. The inflator then emits inflation fluid which inflates the air bag into the vehicle occupant compartment to help protect an occupant of the vehicle.

An air bag and an inflator are typically assembled together as parts of an air bag module which is separate from the collision sensor. The air bag module is located in the vehicle adjacent to the vehicle occupant compartment. For example, an air bag module may be located on the vehicle steering column or in the vehicle instrument panel. An air bag module may also be located in a side portion of the vehicle, such as a door panel, or in another part of the vehicle, such as the roof, the floor, or a seat.

In addition to the air bag and the inflator, an air bag module may include a diffuser and a cover. The diffuser is located between the inflator and the air bag. The cover conceals the other parts of the module from the vehicle occupant compartment, and includes at least one pivotal deployment door which extends directly over the air bag.

When the inflator is actuated, the inflation fluid emitted from the inflator flows into the air bag through the diffuser. As the inflation fluid begins to inflate the air bag, it moves the air bag forcefully outward against the deployment door on the cover. The force of the fluid pressure in the air bag moves the deployment door pivotally open as the inflation fluid continues to inflate the air bag outward from the air bag module into the vehicle occupant compartment.

SUMMARY OF THE INVENTION

The present invention is an apparatus for use with an inflator for an inflatable vehicle occupant protection device. In accordance with the present invention, the apparatus comprises a diffuser structure. The diffuser structure defines a plenum in which the inflator is receivable, and has diffuser walls with inflation fluid outlet openings extending outward from the plenum. The diffuser structure also has first and second clamping walls facing in opposite directions across the plenum. The first clamping wall is bendable pivotally inward across the plenum.

The apparatus further comprises load bearing means for maintaining the first clamping wall under a bending load. The bending load urges the first clamping wall pivotally inward across the plenum so as to retain the inflator tightly between the clamping walls.

In a preferred embodiment of the present invention, the diffuser structure is a single continuous piece of sheet metal. The piece of sheet metal defines an elongated, rectangular base wall. The diffuser walls extend partially around the plenum between opposite side edges of the base wall. The clamping walls project into the plenum from the opposite side edges of the base wall.

In the preferred embodiment of the present invention, the load bearing means comprises a pair of opposed, interconnectable locking tabs which project from the clamping walls. A self-tapping screw interconnects the locking tabs with each other. When the screw is being tightened, it draws the locking tabs, and hence the clamping walls, together under a bending load. The bending load presses the clamping walls firmly against the inflator so as to clamp and retain the inflator securely between the base wall and the clamping walls.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant protection apparatus comprising a preferred embodiment of the present invention;

FIG. 2 is a view showing the apparatus of FIG. 1 in an actuated condition;

FIG. 4 is a schematic view of an electrical circuit including a part of the apparatus of FIG. 1;

FIG. 5 is a side view of a part of the apparatus of FIG. 1;

FIG. 6 is a view taken on line 6—6 of FIG. 5;

DESCRIPTION OF A PREFERRED EMBODIMENT

Figure 3:
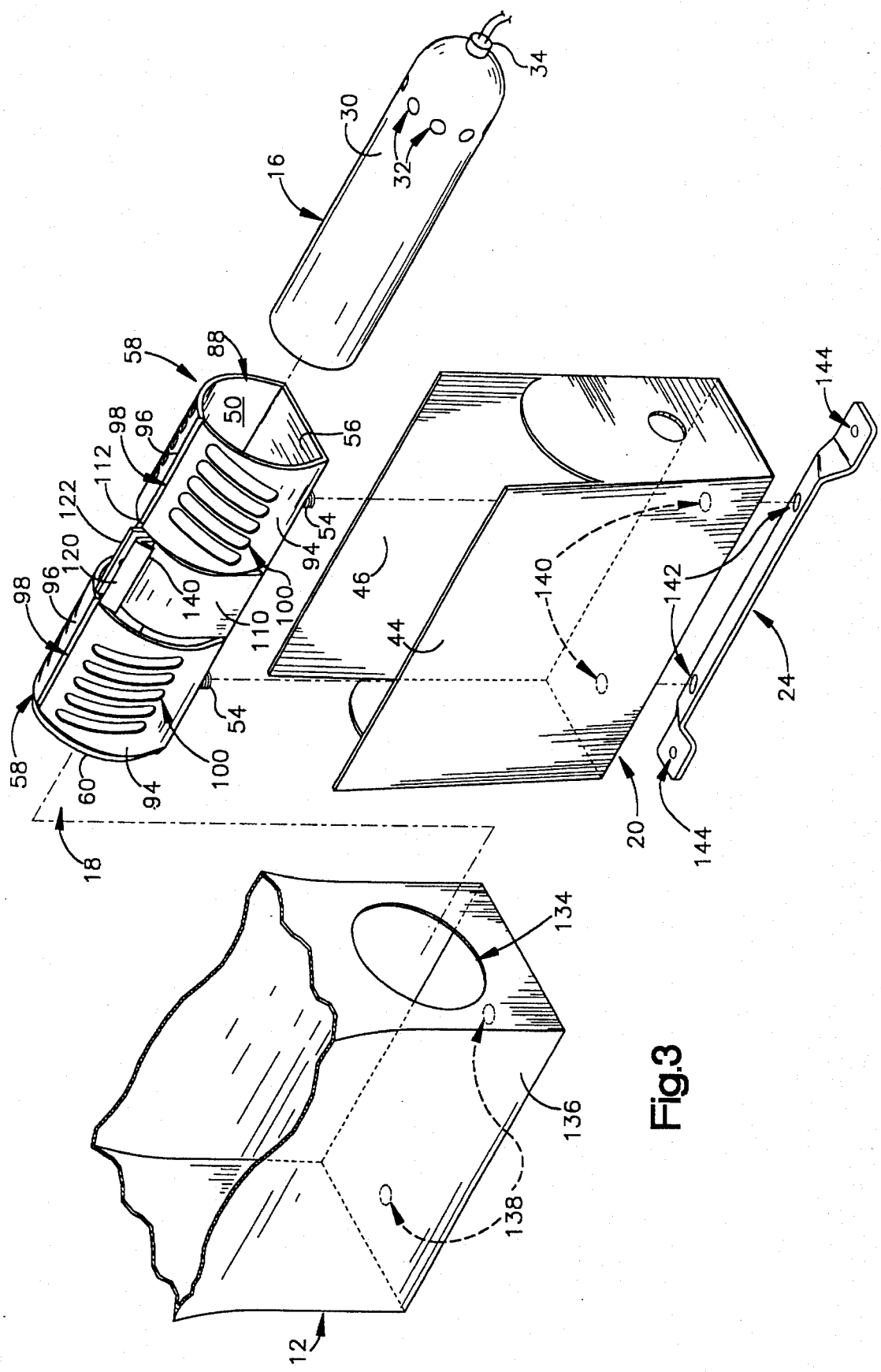
FIG. 3 is an exploded perspective view of parts of the apparatus of FIG. 1.

An apparatus 10 comprising a preferred embodiment of the present invention is shown schematically in FIGS. 1 and 2. The apparatus 10 includes a particular type of inflatable vehicle occupant protection device 12 which is commonly referred to as an air bag. The air bag 12 is inflatable from a folded, uninflated condition, as shown fully in FIG. 1, to an unfolded, inflated condition, as shown partially in FIG. 2. Other inflatable vehicle occupant protection devices that can be used in accordance with the present invention include inflatable seat belts, inflatable knee bolsters, inflatable head liners, and knee bolsters operated by inflatable air bags.

The air bag 12 is part of an air bag module 14. Other parts of the module 14 include an inflator 16, a diffuser 18, and a cover 20. The cover 20 encloses the air bag 12. The air bag 12, in turn, encloses the diffuser 18 and the inflator 16. The module 14 is designed for installation in a vehicle at a location adjacent to the vehicle occupant compartment 22. As shown by way of example in FIGS. 1 and 2, the apparatus 10 further includes a mounting bracket 24 for mounting the module 14 on an upper frame portion 26 of a vehicle seat 28.

The air bag 12 is constructed of panels that can be formed of any suitable air bag material. The panels of air bag material are interconnected along seams that can be formed by stitches, ultrasonic welds, adhesives, heat-staking, or the like, depending upon the particular material of which the panels are formed. Preferably, the air bag 12 is constructed of panels that are formed of a woven nylon fabric coated with silicone. Such an air bag material is known in the art.

The inflator 16 comprises a source of inflation fluid. As known in the art, the inflator 16 may contain an ignitable gas generating material for generating a large volume of inflation gas. The inflator 16 may alternatively contain a stored quantity of pressurized inflation fluid, or a combination of pressurized inflation fluid and ignitable material for heating the inflation fluid. As shown in FIG. 3, the inflator 16 has a cylindrical body wall 30 with a plurality of inflation fluid outlet openings 32. An electrical initiator 34 is located at one end of the inflator 16.

As shown in FIG. 4, the initiator 34 is connected in an electrical circuit 36 with a power source 38, which is preferably the vehicle battery and/or a capacitor, and a normally open switch 40. The switch 40 is part of a sensor 42 which senses a condition indicating the occurrence of a vehicle collision. The collision-indicating condition may comprise, or example, sudden vehicle deceleration caused by a collision. If the collision-indicating condition is at or above a predetermined threshold level, it indicates the occurrence of a collision having at least a predetermined threshold level of severity. The threshold level of collision severity is a level at which inflation of the air bag 12 is desired to help protect an occupant of the vehicle. The switch 40 then closes and electric current is directed through the initiator 34 to actuate the inflator 16.

When the inflator 16 is actuated, it emits the inflation fluid into the diffuser 18. The diffuser 18 directs the inflation fluid into the air bag 12 to inflate the air bag 12. As the inflation fluid begins to inflate the air bag 12, it moves the air bag 12 forcefully outward against a pair of deployment doors 44 and 46 on the cover 20. The force resulting from the fluid pressure acting on the air bag 12 moves the deployment doors 44 and 46 outward through an adjoining cover portion 48 of the vehicle seat 28 as the air bag 12 is inflated outward from the vehicle seat 28 and into the vehicle occupant compartment 22.

The diffuser 18 is a generally tubular structure defining an elongated plenum 50 in which the inflator 16 is located. The diffuser 18 could be formed of two or more pieces of sheet metal that are interconnected in a tubular configuration. However, as shown in FIGS. 5–8, the diffuser 18 in the preferred embodiment of the present invention is a single continuous piece 52 of sheet metal with a tubular configuration. A pair of threaded mounting studs 54 are fixed to the diffuser 18. The mounting studs 54 project from the diffuser 18 for mounting the air bag module 14 (FIG. 1) in a vehicle, either with or without the mounting bracket 24, in a known manner.

The piece 52 of sheet metal has several distinct wall portions which together define the plenum 50. These include a base wall 56, a pair of diffuser wall structures 58, and an end wall 60. The base wall 56 has a rectangular peripheral shape (FIG. 6) with a pair of parallel opposite side edges 62 and 64 and a pair of parallel opposite end edges 66 and 68. The base wall 56 further has a planar inner side surface 70 (FIG. 5) and an oppositely facing, planar outer side surface 72. The mounting studs 54 are preferably fixed to the outer side surface 72 of the base wall 56 by a corresponding pair of welds 74, but could alternatively project outward through apertures in the base wall 56.

The diffuser wall structures 58 extend partially along the length of the base wall 56, and are spaced from each other along the length of the base wall 56. More specifically, the diffuser wall structures 58 have adjacent inner end edges 76 and 78 which face each other along the length of the plenum 50. The inner end edges 76 and 78 are located at the opposite ends of a central section 80 of the plenum 50. The diffuser wall structures 58 further have remote outer end edges 82 and 84 respectively defining first and second outer ends 86 and 88 of the plenum 50. The closure wall 60 projects from the base wall 56 across the first outer end 86 of the plenum 50. A narrow gap 90 may extend around the periphery of the closure wall 60 at the first outer end 86 of the plenum 50.

Each diffuser wall structure 58 includes a pair of individual diffuser walls 94 and 96 (FIG. 7) which are opposed to each other across the plenum 50. The individual diffuser walls 94 and 96 in each pair project from the opposite side edges 62 and 64 of the base wall 56, respectively, and extend partially around the plenum 50 in arcuate configurations that converge to define a narrow gap 98 at a location opposite the base wall 56. A plurality of slots 100 are formed in each of the two individual diffuser walls 94 and 96 in each diffuser wall structure 58. The slots 100 and the gaps 98 together function as inflation fluid outlet openings for directing inflation fluid outward from the plenum 50.

Figure 8:
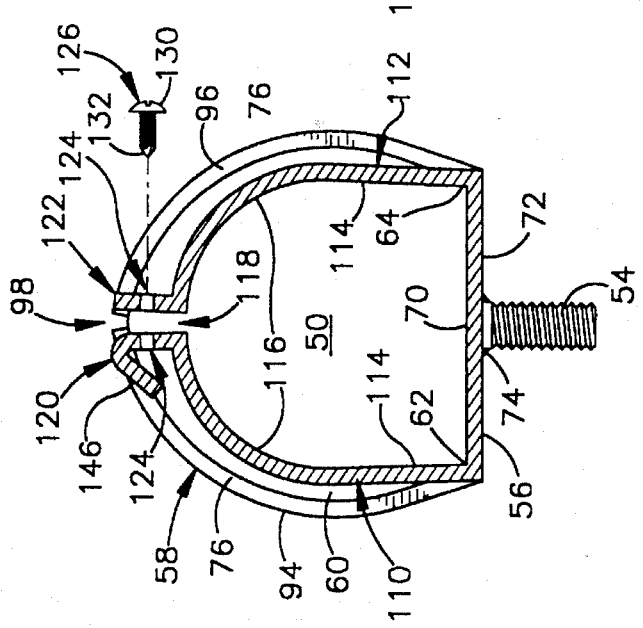
FIG. 8 is a view taken on line 8-8 of FIG. 5.
Figure 7:
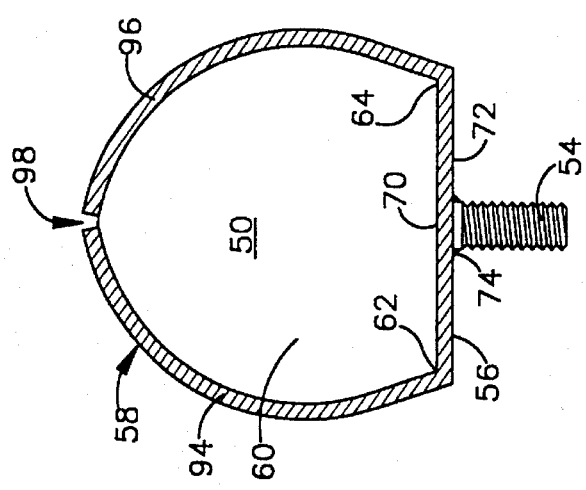
FIG. 7 is a view taken on line 7—7 of FIG. 5.

The piece 52 of sheet metal has additional wall portions defining first and second clamping walls 110 and 112 (FIG. 8). The clamping walls 110 and 112 are located in the central section 80 of the plenum 50, and are centered along the length of the plenum 50. The first clamping wall 110 projects partially across the plenum 50 from the first side edge 62 of the base wall 56. The second clamping wall 112 is directly opposed to the first clamping wall 110, and projects partially across the plenum 50 from the second side edge 64 of the base wall 56.

The clamping walls 110 and 112 have planar portions 114 facing each other across the plenum 50, and also have arcuate portions 116 facing each other across the plenum 50. The planar portions 114 diverge slightly from the side edges 62 and 64 of the base wall 56. The arcuate portions 116 converge from the planar portions 114 to define a narrow gap lib between the clamping walls 110 and 112 at a location opposite the base wall 56. The inner side surface 70 of the base wall 56 thus faces across the plenum 50 toward the arcuate portions 116 of the clamping walls 110 and 112.

At least one of the two clamping walls 110 and 112 is bendable pivotally inward across the plenum 50 against a bias of the sheet metal material. In the preferred embodiment of the present invention shown in the drawings, the two clamping walls 110 and 112 are both bendable pivotally inward across the plenum 50, and are thus movable across the gap 118 from the positions shown in FIG. 8 toward the positions shown in FIG. 9.

An opposed pair of locking tabs 120 and 122 project from the clamping walls 110 and 112, respectively. The locking tabs 120 and 122 have aligned apertures 124 for receiving a fastener 126. In the preferred embodiment of the present invention, the fastener 126 is a self-tapping screw with a driving head 130 and a sharp, threaded shank 132.

As indicated in FIG. 3, the air bag module 14 is assembled by first moving the inflator 16 into the plenum 50 in the diffuser 18 through the second outer end 88 of the plenum 50. The diffuser 18 and the inflator 16 are then moved together into the air bag 12 through an opening 134 in an inner end portion 136 of the air bag 12. The inner end portion 136 of the air bag 12 may be constructed substantially as shown, for example, in U.S. Pat. No. 5,468,012, entitled "Air Bag Module," and assigned to TRW Vehicle Safety Systems Inc. The mounting studs 54 projecting from the retainer 18 are received through a corresponding pair of apertures 138 in the air bag 12 so as to project outward from the air bag 12.

The cover 20 similarly has a pair of apertures 140 through which the mounting studs 54 project when the air bag 12 (then enclosing the diffuser 18 and the inflator 16) has been folded and inserted in the cover 20. The mounting bracket 24 likewise receives the mounting studs 54 through a pair of apertures 142. An additional pair of apertures 144 in the mounting bracket 24 receive a corresponding pair of additional fasteners (not shown) for fastening the air bag module 14 to the upper frame portion 26 of the vehicle seat 28.

Figure 9:
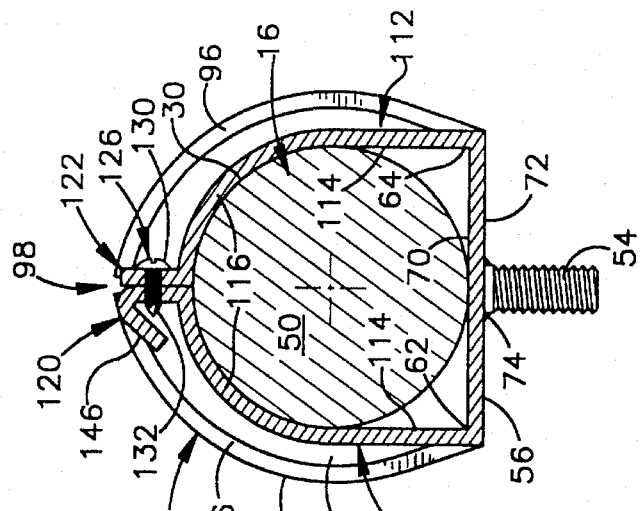
FIG. 9 is a view similar to FIG. 8 showing parts in different positions.

When the inflator 16 has been received within the diffuser 18, as described above, it is clamped in place in accordance with the present invention. Specifically the inflator 16 is first received closely, but relatively loosely, between the base wall 56 and the opposed clamping walls 110 and 112 when it is moved into the plenum 50. The screw 126 is then received and tightened through the aligned apertures 124 in the locking tabs 120 and 122. As the screw 126 is being tightened, it draws the tabs 120 and 122 toward each other across the gap 118 (FIG. 8). The screw 126 thus applies a bending load which bends the clamping walls 110 and 112 pivotally inward across the plenum 50 toward each other. The bending load presses the opposed arcuate portions 116 of the clamping walls 110 and 112 radially inward against the inflator 16. When the screw 126 is fully tightened so as to interlock the tabs 120 and 122 with each other, as shown in FIG. 9, the inflator 16 is clamped and retained securely between the base wall 56 and the clamping walls 110 and 112 with a clamping force that corresponds to the bending load applied and maintained by the screw 126.

In accordance with a particular feature of the present invention, the arcuate portions 116 of the clamping walls 110 and 112 have constant radii of curvature which are equal to the radius of the cylindrical body wall 30 of the inflator 16. This helps to ensure that the inflator 16 is engaged firmly and evenly by the two clamping walls 110 and 112.

In accordance with another particular feature of the present invention, the first locking tab 120 has a screw-shield portion 146 projecting back inward toward the first clamping wall 110. The screw-shield portion 146 of the first locking tab 120 helps to ensure that the folded air bag 12 (FIG. 1) is shielded from the shank 132 on the screw 126.

The foregoing description of the invention refers to a preferred embodiment. However, improvements, changes and modifications to the preferred embodiment can be made within the scope of the invention. For example, the preferred embodiment includes the self-tapping screw 126. A different type of fastener, such as a bolt with a nut, could be used as an alternative. A permanent fastening structure, such as a spot weld, also could be used. Such improvements, changes and modifications within the skill of the art are intended to be covered by the appended claims.

Having described the invention, the following is claimed:

1. Apparatus for use with an inflator for an inflatable vehicle occupant protection device, said apparatus comprising:

a diffuser structure defining a plenum in which the inflator is receivable, said diffuser structure having diffuser walls with inflation fluid outlet openings extending outward from said plenum, said diffuser structure further having first and second clamping walls facing in opposite directions across said plenum, said first clamping wall being bendable pivotally inward across said plenum; and load bearing means for maintaining said first clamping wall under a bending load which urges said first clamping wall pivotally inward across said plenum so as to retain the inflator tightly between said clamping walls.

2. Apparatus as defined in claim 1 wherein both of said clamping walls are bendable pivotally inward across said plenum, said load bearing means maintaining said clamping walls under bending loads which urge said clamping walls pivotally inward across said plenum.

3. Apparatus as defined in claim 1 wherein said clamping walls face each other across said plenum.

4. Apparatus as defined in claim 1 wherein said load bearing means interlocks said clamping walls with each other.

5. Apparatus as defined in claim 4 wherein said load bearing means comprises a pair of locking tabs projecting from said clamping walls and a fastener which interlocks said tabs with each other.

6. Apparatus as defined in claim 5 wherein said fastener is a self-tapping screw, one of said tabs having shield means for concealing a shank portion of said screw.

7. Apparatus as defined in claim 1 wherein said clamping walls have arcuate portions with equal radii of curvature.

8. Apparatus as defined in claim 1 wherein said diffuser structure further includes a planar base wall facing across said plenum toward said clamping walls.

9. Apparatus as defined in claim 8 wherein said plenum is located on one side of said base wall, said apparatus further comprising a plurality of mounting studs projecting longitudinally from an opposite side of said base wall.

10. Apparatus as defined in claim 8 wherein said diffuser walls, said clamping walls, and said base wall are portions of a single continuous piece of sheet metal.

11. Apparatus as defined in claim 1 wherein said plenum is elongated and has opposite and spaced apart end portions.

12. Apparatus as defined in claim 11 wherein said diffuser walls define said opposite end portions of said plenum and further define a central portion of said plenum in which said clamping walls are located.

13. Apparatus as defined in claim 11 wherein said clamping walls are centered midway between said opposite ends of said plenum.

14. Apparatus for use with an inflator for an inflatable vehicle occupant protection device, said apparatus comprising:

a single continuous piece of sheet metal having wall portions defining an elongated plenum in which the inflator is receivable, said wall portions including an elongated base wall and a pair of diffuser wall structures which are spaced from each other along said base wall, each of said diffuser wall structures having inflation fluid outlet openings and including a pair of individual diffuser walls extending partially around said plenum from opposite side edges of said base wall;

said piece of sheet metal further having a pair of opposed clamping walls projecting into said plenum from said opposite side edges of said base wall at locations between said diffuser wall structures;

said clamping walls being bendable pivotally toward each other across said plenum and being interconnectable in positions engaging the inflator so as to clamp the inflator against said base wall.

15. Apparatus as defined in claim 14 wherein said piece of sheet metal further has a pair of opposed locking tabs projecting from said clamping walls, said apparatus further comprising fastener means for interlocking said tabs with each other.

16. Apparatus as defined in claim 15 wherein said fastener means comprises a self-tapping screw, one of said locking tabs having shield means for concealing a shank portion of said screw.

17. Apparatus as defined in claim 14 wherein said plenum is located on one side of said base wall, said apparatus further comprising a plurality of mounting studs projecting longitudinally from an opposite side of said base wall.

* * * * *